INVENTORS
HAROLD J. ACHTERLING
DONALD J. SPENCER
ROBERT C. PERRY
ALDO C. PROSA
BY
Elliott & Pastoriza
ATTORNEYS INVENTORS
HAROLD J. ACHTERLING
DONALD J. SPENCER
BY ROBERT C. PERRY
ALDO C. PROSA Elliott & Pastoriza
ATTORNEYS

United States Patent Office 3,441,124
Patented Apr. 29, 1969

3,441,124
RULE INSERTING APPARATUS FOR
LINECASTING MACHINES
Harold J. Achterling, 7721 Oakdale, Canoga Park, Calif. 91306; Aldo C. Prosa, 15127 Camarillo St., Sherman Oaks, Calif. 91403; Donald J. Spencer, 7938 Driscoll Ave., Van Nuys, Calif. 91406, and Robert C. Perry, 7721 Riverton Ave., Sun Valley, Calif. 91352
Filed Aug. 8, 1966, Ser. No. 571,127
Int. Cl. B41b 9/16
U.S. Cl. 199—61                                      5 Claims

ABSTRACT OF THE DISCLOSURE

A linecasting machine includes a rule element inserting device arranged to insert rule elements into an arrangement of slugs cast by the linecasting machine without contacting the printing edges of the rule elements. An ejector element is arranged to reciprocate transversely of a horizontal magazine containing a plurality of rule elements whose printing edges face upwardly. The ejector member has a reduced thickness section defining a shoulder which engages only side edges of the rule elements and shoves them accurately into the arrangement of slugs.

---

This invention relates generally to linecasting machines used in newspaper printing, and more particularly, to an automatic device for use with linecasting machines for inserting rule elements into a galley or "stick" of line slugs produced by the linecasting machine.

The preparation of printing matter, such as classified ads for example, involves casting and then assembling a plurality of line slugs of type into a column commonly called a galley or stick. This operation is automatically performed by conventional linecasting machines well known in the art. In practice, the individual classified ads to be printed by the galley of type, are separated by horizontal lines printed from rule elements inserted at appropriate places within the galley.

Automatic devices have been developed for inserting the rule elements into the galley of line slugs on a linecasting machine. While such devices have eliminated manual insertion of the rule elements, their use has necessitated considerable modification of the linecasting machine and its control mechanism, with the result that the overall costs of design and installation have been quite high.

A particular problem involves the manner in which prior art devices eject each rule element from the device onto the line slug receiver of the linecasting machine. As is well known, the top edge of each rule element constitutes the printing edge when disposed within a galley of line slugs. With prior art devices the ejector mechanism is often arranged to contact the top or printing edge of each rule element as the same is ejected from the device. As a consequence, the mechanism may dent or deform the printing edge of the rule element, with the result that the line ultimately printed by the rule element will not be smooth and straight. Of course, such damage necessitates frequent replacement of the rule elements, which under ideal circumstances, should be capable of repeated use.

Other problems have developed in relation to coordinating the action of the rule inserting device with that of the linecasting machine to insure that the rule elements will be positioned in the galley of line slugs at the proper time and in the proper position.

With the foregoing in mind, it is accordingly a primary object of this invention to provide an improved automatic rule inserting device adapted to be mounted on and operated by a linecasting machine in a manner requiring a minimum of modifications to the linecasting machine and its control mechanism.

More particularly, it is an object to provide an improved automatic rule inserting device for linecasting machines which eject rule elements onto the linecasting machine without striking or contacting the printing edges of the rule elements, with the result that the rule elements provide straight, smooth and unblurred lines in a subsequent printing operation.

Another object is to provide an automatic rule inserting device which is operable in a smooth, positive manner in correlation with the operation of the linecasting machine, with the result that malfunctions and stoppages are substantially eliminated.

Briefly, these and many other objects and advantages of this invention are attained by providing an automatic rule inserting device adapted to be coupled to and operated by a conventional linecasting machine used in newspaper typesetting operations. The typical linecasting machine may be operated by a tape controlled mechanism and includes an elevator assembly for positioning a plurality of line slugs of type on a line slug receiver into which the rule elements are to be inserted at desired locations.

In accordance with the invention, the rule inserting device includes ejector means for ejecting a rule element adjacent to a line slug on the line slug receiver of the linecasting machine. The device further includes means responsive to movement of the elevator assembly for actuating the ejector means. Locking and release means are provided for the ejector means and are operable by the control mechanism for releasing the ejector means to enable it to eject a rule element in response to movement of the elevator assembly.

In the preferred form of the invention, the rule inserting device includes a magazine for containing a plurality of rule elements which are positioned to be conveniently ejected onto the line slug receiver without incurring any damage to the printing edge of each of the rule elements.

A better understanding of the invention will now be had by referring to a preferred embodiment thereof as illustrated in the accompanying drawings, in which.

Figure 1:
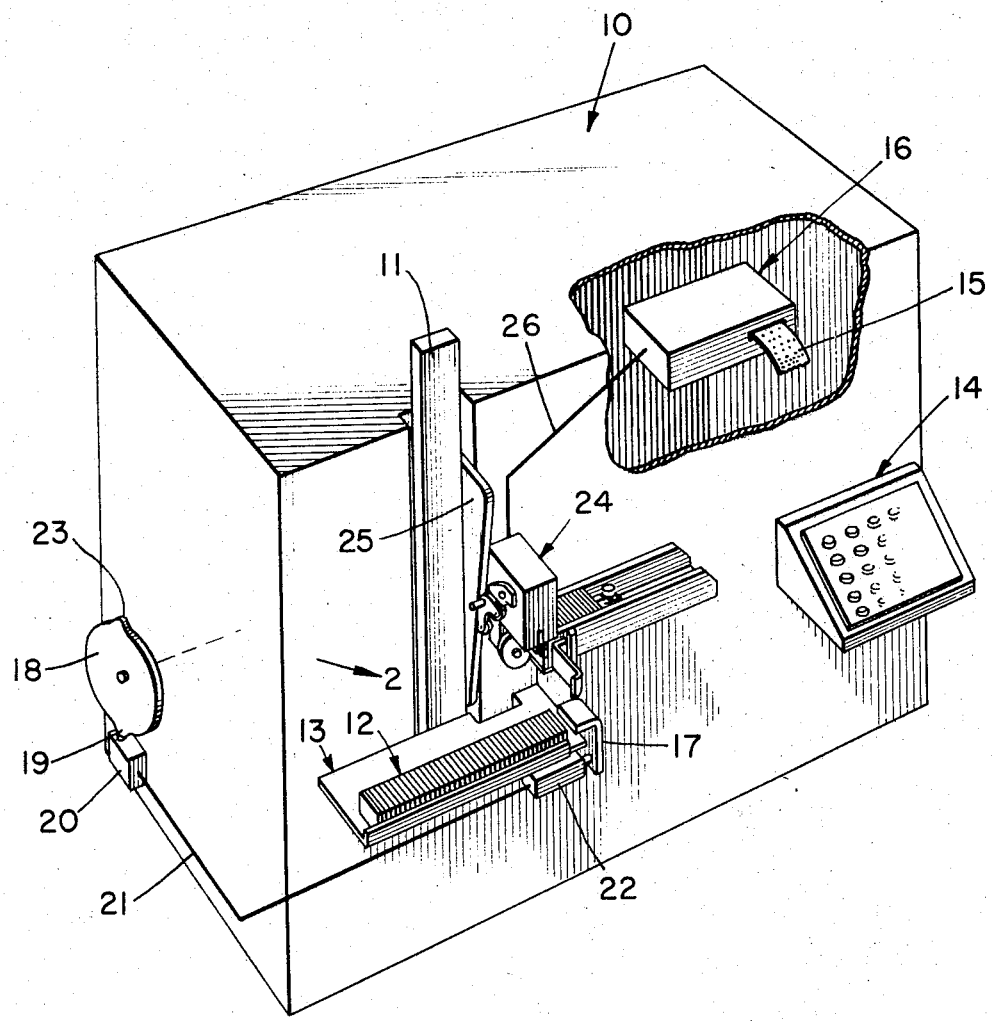
FIGURE 1 is a perspective, somewhat schematic view, of a linecasting machine incorporating the rule inserting device of the invention.

Referring first to FIGURE 1, a linecasting machine 10 is shown in somewhat schematic form and includes an elevator mechanism 11 for sequentially positioning a plurality of line slugs of type 12 onto a line slug receiver 13 in the well known manner.

The numeral 14 designates the key board of the machine 10, which in more modern operations, has been operationally replaced by an automatic control mechanism in which a control tape 15 is received within an electrical readout device 16, including suitable circuitry for controlling the operation of the linecasting machine. The arrangement and operation of the control tape 15 and readout device 16 are well known in the art and need not be described in detail here.

A "jogger" member 17 is pivotally mounted on an end of the line slug receiver 13 opposite the galley of line slugs 12 for positioning each incoming line slug closely adjacent the others so as to provide a space for the next line slug to be delivered from the linecasting machine. The jogger 17 may be actuated by means including a wheel 18 forming part of the machine 10 and including a cam shoe 19 for actuating a microswitch 20 upon each complete revolution of the wheel 18. The microswitch 20 may be electrically connected by a lead wire 21 to a solenoid 22 which operates the jogger 17. The operation of the apparatus of the invention is enhanced by providing a second cam shoe 23 on the wheel 18 at a point diametrically opposed to the first mentioned cam shoe 19. By this arrangement, the jogger 17 will be actuated twice during each cycle of the machine in order that a clear space will be provided between the end of the line slugs 12 and the jogger 17 for a rule element to be dropped therein by means to be described.

In accordance with the primary purpose of the invention, a rule inserting device 24 is secured to an end of the line slug receiver 13 in a position to drop a rule element onto the receiver 13 between the line slugs 12 and the jogger 17 in accordance with the operation with the linecasting machine.

A cam plate 25 is secured to the elevator assembly 11 for conjoint vertical movement to mechanically actuate the rule inserting device 24 in conjunction with an electrical signal sent through a lead wire 26 connected between the device 24 and the readout device 16, all in a manner to be subsequently described in greater detail.

Figure 2:
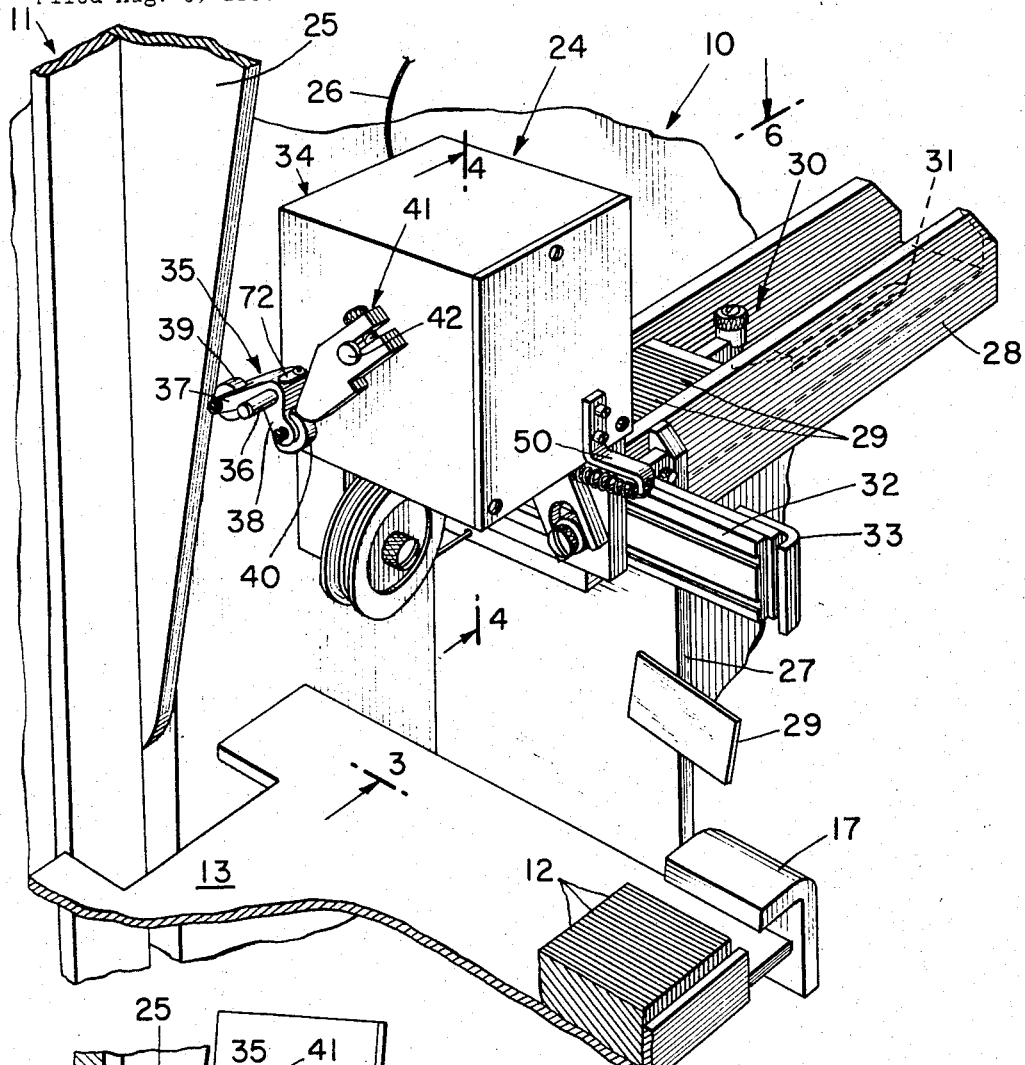
FIGURE 2 is a fragmentary perspective view of the rule inserting device and associated portions of the linecasting machine taken generally in the direction of arrow 2 in FIGURE 1.

Referring now to FIGURE 2, the structural arrangement of the rule inserting device 24 will be seen more clearly. The device 24 includes a mounting plate 27 secured against an end of the line slug receiver 13 by means of a pair of screws (not shown).

The rule inserting device 24 includes a magazine 28 secured on the plate 27 for containing a plurality of rule elements 29 which are conventional and well known in the art. The rule elements 29 are positioned in side by side relation with the top edges of each constituting the printing edge when positioned within the galley of line slugs 12 in a manner to be described. The rule elements 29 are maintained in the position shown by means of a spring biased follower mechanism 30 which is mounted for movement within a slot 31 defined in the bottom of the magazine 28.

As will be subsequently described in greater detail, the device 24 includes means for sequentially ejecting the rule elements from the magazine 28 onto the line slug receiver 13 into the space defined between the endmost line slug 12 and the jogger 17. Toward that end, an ejector member 32 is mounted for transverse or lateral sliding movement through an end of the magazine 28 for sliding a rule element from the magazine. An L-shaped guide member 33 is secured to a side of the magazine 28 in spaced parallel relation to the ejector member 32 for providing a guide for a rule element as the same is moved from the magazine between the ejector member 32 and guide 33. A rule element 29a is shown dropping by gravity from between the ejector member 32 and guide 33 onto the line slug receiver 13.

The ejector means of the device includes a housing portion 34 secured to an end of the magazine 28 for housing several components of the ejector means as will be subsequently described.

The ejector means of the rule inserting device is adapted to be mechanically actuated in response to the normal vertical movement of the elevator assembly 11 as it delivers line slugs onto the receiver 13 during operation of the linecasting machine. Toward this end, a rocker member 35 is mounted for pivoting movement on a pin 36 secured to a side of the housing 34. The rocker 35 includes a pair of diverging arm portions 37 and 38 and mounting rollers 39 and 40, respectively. The rocker 35 is normally positioned on the pin 36 such that the roller 39 is engagable by the curved edge of the cam plate 25 secured to the elevator assembly 11. The other roller 40 is engaged against the underside of a cam lever 41 secured on a shaft 42 rotatably received through the housing 34.

Figure 3:
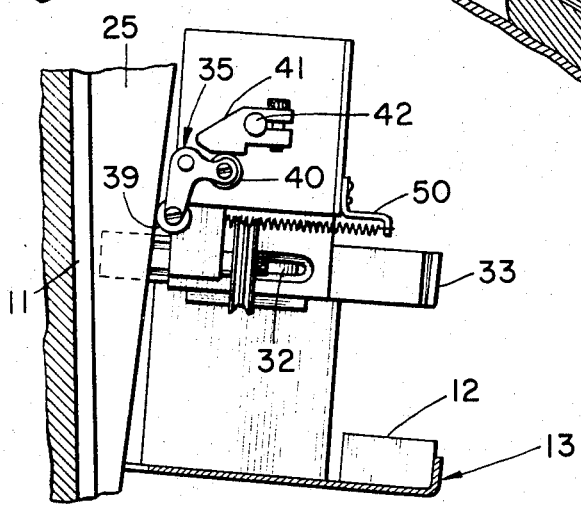
FIGURE 3 is a fragmentary side elevation view of the rule inserting device taken in the direction of arrow 3 of FIGURE 2.

The basic aspects of the cooperation of the ejector means and the elevator assembly will become clearer by comparing FIGURES 2 and 3. In FIGURE 2, the elevator 11 and cam plate 25 are shown in a raised position permitting the rocker 35 and cam lever 41 to be pivoted as shown to thus position the ejector member 32 to eject the rule element 29a. In FIGURE 3, the elevator 11 and cam plate 25 are in a lowered position wherein the roller 39 is engaged by the cam plate 25 to pivot the rocker 35 and cam lever 41 into the position shown to move the ejector member 32 to the left into a retracted position.

Figure 4:
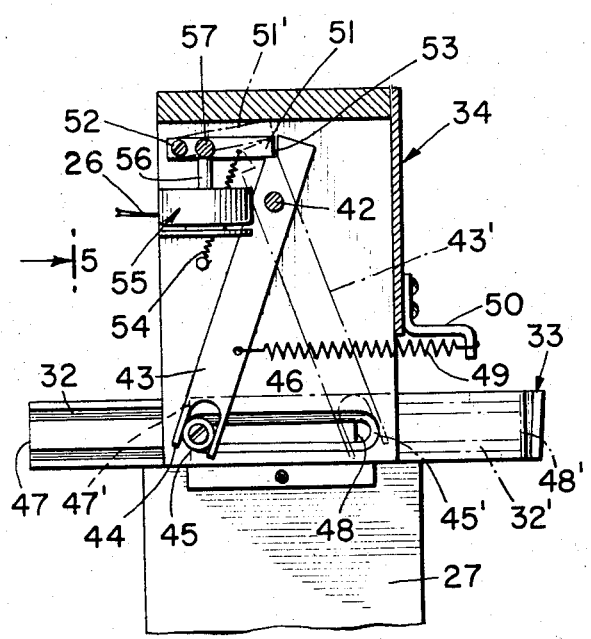
FIGURE 4 is a fragmentary sectional view taken substantially on the section line 4—4 of FIGURE 2.
Figure 5:
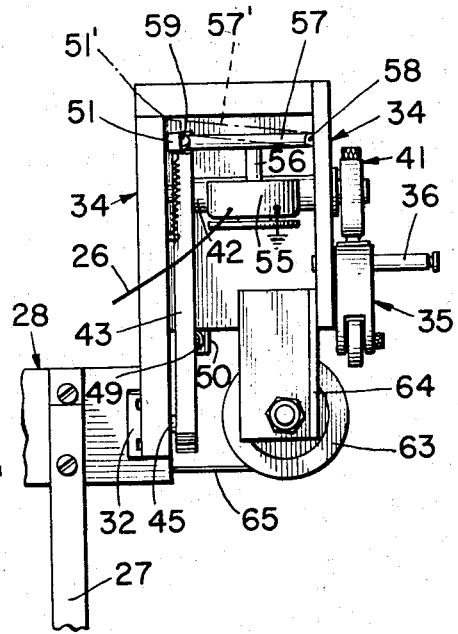
FIGURE 5 is a fragmentary elevation view taken generally in the direction of arrow 5 of FIGURE 4; and, FIGURE 6 is a top plane view of the rule inserting device taken generally in the direction of arrow 6 of FIGURE 2.

Further details of the arrangement of the ejector means of the device will become apparent with reference now to FIGURES 4 and 5. An ejector lever 43 is secured on the shaft 42 and includes a fork portion 44 formed on it lower end for receiving a pin 45 secured to the ejector member 32. The pin 45 projects through an elongated slot 46 (FIGURE 4) defined in the side of the housing 34 proximate to the magazine 28. The slot 46 thus defines the limits of the sliding movement of the ejector member 32; the opposite ends of the ejector member 32 being shown at 47 and 48 respectively.

As best shown in FIGURE 4, a coil spring 49 is secured at one end to the ejector lever 43 and at its other end to a bracket 50 secured to the housing 34. The spring 49 serves to move the ejector lever 43 and ejector member 32 into the positions shown in dotted lines at 43' and 32' respectively, upon release of the ejector means as will now be described.

Referring still to FIGURES 4 and 5, the device includes means for locking the ejector means in the solid line position and then releasing the same for movement to the dotted line position. Toward that end, a locking level 51 is pivotally mounted within the housing 34 by means of a pivot pin 52 received through one end thereof. The opposite end of the locking lever 51 is received against a notch 53 defined in the upper portion of the ejector lever 43. A spring 54 is secured to the lever 51 and housing 34 for normally holding the lever 51 in engagement with the notch 53.

The locking and release means further includes a solenoid 55 mounted within the housing 34 by means of suitable brackets (not shown). The solenoid 55 receives the lead wire 26 and is connected to ground potential as indicated. The solenoid 55 includes a push rod 56 which engages the underside of a transfer lever 57 which is pivotally connected to the housing 34 and the lever 51 by pivot joints 58 and 59, respectively, shown in FIGURE 5.

Figure 6:
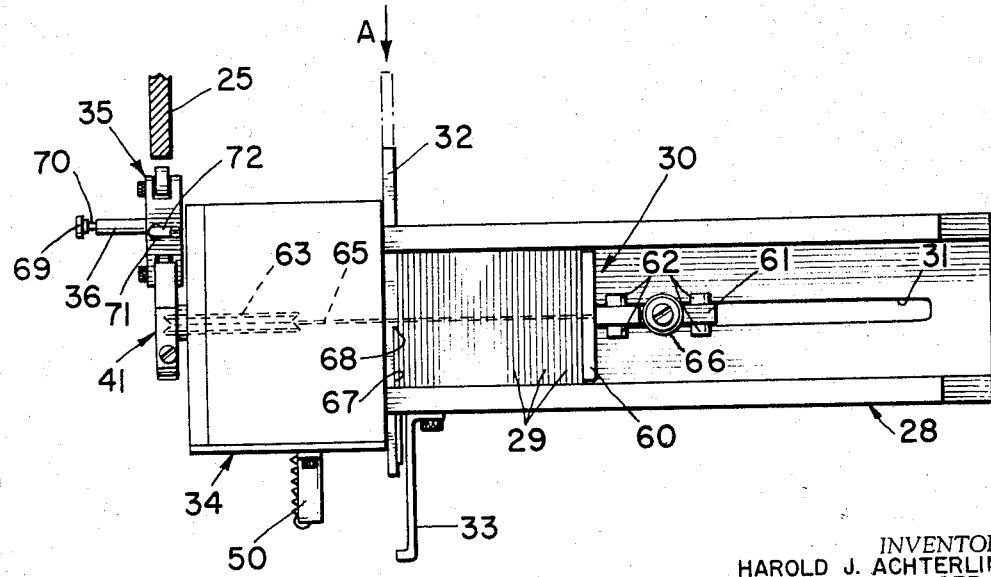

Referring now to FIGURE 6, the details of the follower mechanism 30 will be seen more clearly. The follower mechanism 30 includes an end plate 60 abutting against an end one of the plurality of rule elements 29. A frame member 61 is secured to the plate 60 and is disposed within the slot 31. The frame member 61 is supported for movement within the magazine 28 by means of bearings 62.

The follower mechanism 30 is urged against the rule elements 29 by means including a spring-loaded wheel 63, which as best shown in FIGURE 5, is coupled to the housing 34 by a mounting bracket 64. A cord 65 is secured on the wheel 63 and extends beneath the magazine 28 into coupled engagement with the frame member 61 of the follower mechanism. The frame member 61 may include a gripping knob 66 by which the follower mechanism may be conveniently gripped to move the same to the right, as viewed in FIGURE 6, against the force of the spring-loaded wheel 63 when it is desired to add rule elements into the magazine 28.

An important feature of the invention relates to the manner in which the rule elements are engaged for ejection from the magazine 28. As shown in FIGURE 6, the ejector member 32 includes a section 67 of reduced thickness joining a shoulder 68. The length of the section 67 is approximately the same as the length of the rule elements 29, while the lateral extent of the shoulder 68 is the same or slightly less than the width of thickness of each rule element. Accordingly, the end of the leftmost rule element 29 will be engaged by the shoulder 68 as the ejector member 32 slides the same from the magazine 28 in the direction of arrow A. It will be apparent that the top or printing edge of each of the rule elements is not engaged by any portion of the ejector means and consequently the printing edges cannot be damaged in any manner. Moreover, it will be appreciated that rule elements of varying thickness of "point" gauge, may be accommodated by simply inserting an ejector member having a shoulder of suitable extent.

Referring still to FIGURE 6, the end of the pin 36 includes an enlarged diameter portion 69 adjacent to an annular groove 70. The rocker 35 is slidable on the pin 36 so as to be disposed adjacent to the portion 69 and thus out of the path of vertical movement of the cam plate 25 when desired. The rocker 35 may be locked in this position by means including a ball 71 slidably received in a rocker 35 for engagement of the groove 70. A leaf spring 72 is mounted on the rocker 35 for pressing the ball 71 downwardly into the groove 70. It will be understood that another groove could be formed on the pin 36 so as to be engaged by the ball 71 when the rocker 35 is in the operative position. Accordingly, the rocker 35 will not vibrate or otherwise move between its operative and unoperative positions.

The operation of the invention will now be described. With reference first to FIGURE 1, the linecasting machine will cast and then deliver the line slugs 12 onto the receiver 13 in the conventional manner in accordance with the program read from the tape 15. The rotation of the wheel 18 is correlated to the speed of operation such that the jogger 17 will be actuated twice during each delivery cycle to first move each line slug adjacent to the others, and secondly to move a rule element against the last line slug should a rule element be ejected onto the receiver at that time.

As shown in FIGURE 3, downward movement of the elevator 11 causes the cam plate 25 to engage the roller 39 to pivot the rocker 35 and cam lever 41 into a position wherein the ejector lever 43 and ejector member 32 will be moved against the force of the spring 49 into positions as shown in solid lines in FIGURE 4. The locking lever 51 will then be pivoted downwardly by the spring 54 to engage the notch 53 to thus lock the ejector means in a retracted position preparatory to ejecting a rule element. It will be apparent that the ejector means will remain in the locked and retracted position as the cam plate 25 moves upwardly with the elevator 11 and out of engagement with the roller 39.

When the readout device 16 receives a code signal from the tape 15 for the insertion of a rule element into the galley of line slugs, an electrical signal is stored in suitable circuitry for transmission to the rule inserting device 24 at the appropriate time.

As the elevator 11 moves downwardly into the position of FIGURE 3, the cam plate 25 will again engage the roller 39 to rotate the ejector lever 43 in a clockwise direction just enough to provide a gap between the notch 53 and the locking lever 51 shown in FIGURE 4. The stored signal will then be transmitted through the lead wire 26 to the solenoid 55 to move the push rod 56 upwardly. As best shown in FIGURE 5, the push rod 56 pivots the transfer rod 57 upwardly about the pivot joint 58 into the raised position shown in dotted lines at 57'. As best shown in FIGURE 4, the locking lever 51 is thus pivoted about the pivot pin 52 against the tension of the spring 54 into the raised position shown in dotted lines at 51'. Due to the above described slight clockwise rotation of the ejector lever 43, the resultant gap between the notch 53 and the end of the locking lever 51 ensures that no friction will occur therebetween as the lever 51 pivots to its raised position.

With the cam plate 25 engaging the roller 39 as shown in FIGURE 3, it will be apparent that subsequent upward movement of the elevator 11 and cam plate 25 will cause the rocker 35 to pivot in a clockwise direction permitting the cam lever 41, shaft 42, and ejector lever 43 to pivot in a counterclockwise direction, all in response to the force of the spring 49 as shown in FIGURE 4. Consequently, the ejector lever 43 and ejector member 32 are moved into the positions shown in dotted lines at 43' and 32' respectively.

As is apparent in FIGURES 2 and 6, this movement of the ejector member 32 permits the same to slide a rule element from the magazine 28, whereupon the rule element falls freely onto the line slug receiver 13 into the space between the line slugs 12 and the jogger 17. At this point, the wheel 18 (FIGURE 1) will have rotated to move one of the cam shoes 19 or 23 into engagement with the microswitch 20 to actuate the same. The solenoid 22 will thus be actuated to cause the jogger 17 to lightly tap the rule element into position against the end of the plurality of line slugs 12, thus providing a space between the rule element and the jogger for receiving a line slug to be subsequently positioned therebetween as the linecasting machine continues its operation.

Upon ejecting a rule element as above described, subsequent downward movement of the elevator 11 will again cause the curved edge of the cam plate 25 to engage the roller 39 and thus return the components of the ejector means to the position as shown in FIGURE 3 to thus move the ejector member 32 and ejector lever 43 into the positions shown in solid lines in FIGURE 4. During this movement, the solenoid 55 will be de-energized, whereupon the locking lever 51 will pivot downwardly in response to the force of the spring 54 to engage the notch 53.

If for any reason it is desired to operate the linecasting machine without the operation of the rule inserting device, the rocker 35 may be moved outwardly on the pin 36 to thus position the rocker out of the path of vertical movement of the cam plate 25. The leaf spring 72 presses the ball 71 downwardly into engagement with the groove 70 to thereby prevent the rocker 35 from moving back to its original position in response to vibrations and the like.

From the foregoing it is apparent that the invention automatically inserts rule elements into a gallery of line slugs in a smooth-acting positive manner. The rule elements are ejected in a novel manner which precludes the possibility of the printing edges thereof being struck and damaged. The rule inserting device may be coupled to conventional linecasting machines without requiring any extensive modification of the machine. Moreover, the rule inserting device is compact and does not interfere with convenient accessibility to the linecasting machine for maintenance and repair as required.

What is claimed is:

1. In a linecasting machine operated by a control mechanism and having elevator means for positioning a plurality of slugs on a line slug receiver; a rule element inserting device for inserting rule elements into the arrangement of line slugs cast by the linecasting machine without contacting the printing edges of the ruled elements, the inserting device comprising:

(a) a substantially horizontally aligned magazine for containing a plurality of adjacent rule elements of a given width aligned vertically with their printing edges facing upwardly, the magazine having a longitudinal axis;

(b) a rule element ejector member;

(c) a reduced thickness section formed in the ejector member that is movable to a position adjacent rule elements moved successively to one end of the magazine, the reduced thickness section being sized to at least partially retain successively moved rule elements;

(d) a shoulder defined by a rearward portion of the reduced thickness section and having a thickness equal to or less than the given width of the rule elements, the shoulder being positioned to engage and exert pushing force on a single side edge of the rule elements without contacting their printing edges;

(e) actuating means responsive to movement of the elevator means for reciprocating the ejector member laterally of the magazine longitudinal axis within a substantially vertical plane to push an adjacent rule element away from the other rule elements and into the arrangement of line slugs cast by the line casting machine; and, (f) locking and release means for the ejector member operatable by the control mechanism for releasing the ejector member to enable it to eject a rule element in response to movement of said elevator means.

2. The subject matter of claim 1, in which said actuating means responsive to movement of said elevator means includes cam means secured on said elevator means for conjoint vertical movement, said control mechanism including a tape controlled electrical readout device, and said locking and release means including solenoid means responsive to an electrical signal from said readout device for actuating said locking and release means.

3. The subject matter according to claim 2 including:
a rocker member coupled to the ejector member and positioned to be actuated by said cam means;
cam lever means movable in response to actuation of said rocker member; and
ejector lever means coupled to said cam lever means for conjoint movement.

4. The subject matter of claim 3, in which said locking and release means includes a locking lever engageable with raid ejector lever means to hold said ejector lever means and said ejector member against movement.

5. The subject matter of claim 4, in which said solenoid means is coupled to said locking lever for moving said locking lever out of engagement with said ejector lever means in response to said electrical signal.

References Cited

UNITED STATES PATENTS

| | | | |
|---|---|---|---|
| 2,872,026 | 2/1959 | Larson | 199—61 |
| 3,021,940 | 2/1962 | Fan | 199—61 |
| 3,071,241 | 1/1963 | Coffield et al. | 199—61 |
| 3,262,555 | 7/1966 | Roberts | 199—61 |

ROBERT E. PULFREY, *Primary Examiner.*

EUGENE H. EICKHOLT, *Assistant Examiner.*